United States Patent
Butucea Panait et al.

(10) Patent No.: US 11,567,835 B2
(45) Date of Patent: Jan. 31, 2023

(54) DATA PROTECTION AND RECOVERY

(71) Applicant: KYNDRYL, INC., New York, NY (US)

(72) Inventors: Marcel Butucea Panait, Brno (CZ); Erik Rueger, Ockenheim (DE); Jiri Barak, Arlon (BE); Nicolo' Sgobba, Bratislava (SK)

(73) Assignee: Kyndryl, Inc., New York, NY (US)

( * ) Notice: Subject to any disclaimer, the term of this patent is extended or adjusted under 35 U.S.C. 154(b) by 37 days.

(21) Appl. No.: 17/239,635

(22) Filed: Apr. 25, 2021

(65) Prior Publication Data

US 2022/0342774 A1    Oct. 27, 2022

(51) Int. Cl.
*G06F 7/00* (2006.01)
*G06F 11/14* (2006.01)
*G06N 5/04* (2006.01)
*G06N 20/00* (2019.01)

(52) U.S. Cl.
CPC ...... *G06F 11/1469* (2013.01); *G06F 11/1461* (2013.01); *G06N 5/04* (2013.01); *G06N 20/00* (2019.01); *G06F 2201/84* (2013.01)

(58) Field of Classification Search
CPC ............. G06F 11/1469; G06F 11/1461; G06F 2201/84; G06N 20/00; G06N 5/04
USPC .................................................. 707/600–899
See application file for complete search history.

(56) References Cited

U.S. PATENT DOCUMENTS

| | | | |
|---|---|---|---|
| 2016/0350102 | A1* | 12/2016 | Karpuram ................. G06F 8/65 |
| 2018/0373722 | A1 | 12/2018 | Ulasen |
| 2020/0241967 | A1 | 7/2020 | Dain |
| 2020/0320450 | A1 | 10/2020 | Datta Ray |

FOREIGN PATENT DOCUMENTS

EP         2422274 B1     5/2020
WO    2010124023 A2    10/2010

OTHER PUBLICATIONS

"Automatic Event-Driven Backup Recommendation Engine in Database Deployments", IP.com No. IPCOM000263492D, IP.com Electronic Publication Date: Sep. 4, 2020, 6 pps.
"Backup / Recovery / Disaster Recovery", Bitcom 2016, 85 pps., < https://www.bitkom.org/sites/default/files/file/import/170125-LF-Backup-Recovery.pdf>.
Mell et al., "The NIST Definition of Cloud Computing", National Institute of Standards and Technology, U.S. Department of Commerce, NIST Special Publication 800-145, Sep. 2011, 7 pages.

\* cited by examiner

*Primary Examiner* — Isaac M Woo

(57) ABSTRACT

Generating a data protection and recovery data backup option by identifying static and runtime metadata for a computing application, determining application criticality of the computing application according to the static metadata using a first machine learning model, determining a data backup option for the computing application according to application criticality and the runtime metadata, using a second machine learning model.

17 Claims, 4 Drawing Sheets

DATA PROTECTION AND RECOVERY

FIELD OF THE INVENTION

The disclosure relates generally to the machine learning-based data protection and recovery. The disclosure relates particularly to machine learning-based application evaluation, data protection, and recovery backup option generation.

BACKGROUND

Entities store and use more data than ever before. The amount of data is growing exponentially. The growth produces increases the dependence of companies on data and IT processes. The growth also requires more data to be stored for longer periods of time. Competition requires companies to introduce more efficient methods to manage data economically and to protect the data from loss and unavailability.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable generation of data protection and recovery options.

Aspects of the invention disclose methods, systems and computer readable media associated with generating a data backup option by identifying static and runtime metadata for a computing application, determining application criticality of the computing application according to the static metadata using a first machine learning model, and determining a data backup option for the computing application according to the application criticality and the runtime metadata, using a second machine learning model.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
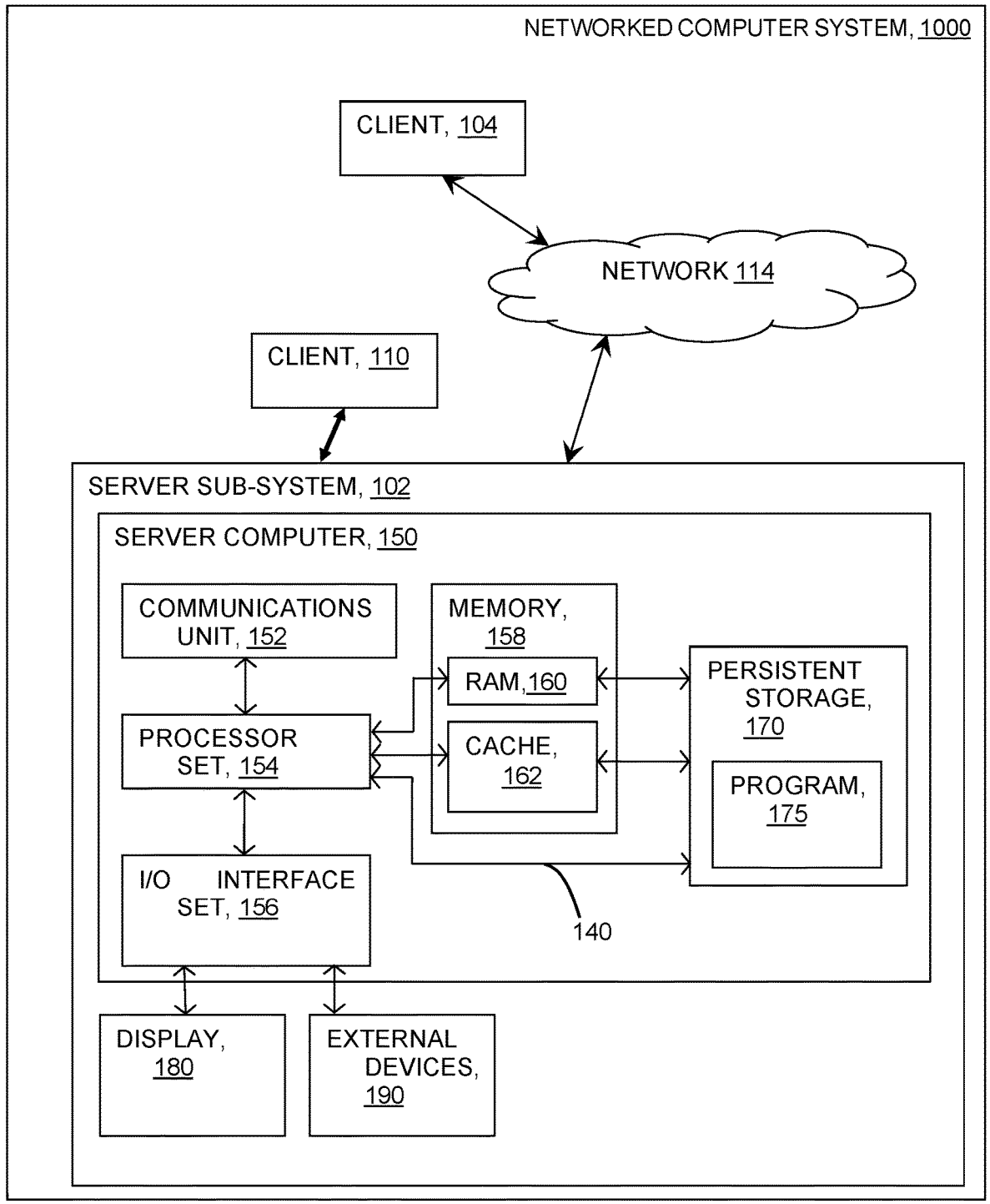
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Data backup, archival, and disaster recovery infrastructure of an enterprise represents a data gathering and analysis opportunity for a holistic view of an organization's IT assets. To successfully implement and manage the increasing demands on DP&R (Data Protection & Recovery), an ever-higher degree of automation of DP&R processes is required. Like a conductor, those responsible for backup should be able to orchestrate backup processes using central guidelines. The actual execution and monitoring, on the other hand, should be more and more rule-based and automated. These capabilities simplify the integration of typical cloud services such as DPaaS (Data Protection as a Service) and DRaaS (Disaster Recovery as a Service), as well as cloud storage for backup data. Current data backup concepts should therefore contain a high degree of automation and be cloud ready. Disclosed embodiments the automation of DP&R activities for the better protection of enterprise application data assets Leveraging information and knowledge gathered and extracted by means of an existing backup infrastructure, the classifier system described would recommend infrastructure optimizations and act on said optimizations for the purpose of improving qualitative and quantitative performance indicators of an IT organization.

A data-type aware model monitors existing IT applications and associated data using information gathered from backup systems. Embodiments train such a model based on industry best practices and company policies and evaluate the enterprise IT applications existing backup procedures against best practice standards, recommending actions for optimization.

In an embodiment, a method comprises a supervised machine learning approach for backup strategy option generation and placement. The method uses a learning system to define the computing environment's criticality and backup option classes based on previous learning data, including metadata pertaining to computing application.

The method generates pre-annotated training and testing data sets by monitoring existing runtime environments. The method utilizes the training and testing data sets and supervised learning approaches to train one or more supervised machine learning models, e.g., neural networks. The goal is to get the model(s) trained to separate the training data in different groups (classes). The model classifies and separates the training data based on the metadata of the individual application modules, with the pre-annotated training data. The method then uses the model to manage new computing applications based on data classification of the applications' metadata.

In an embodiment, one or more components of the system can employ hardware and/or software to solve problems that are highly technical in nature (e.g., identifying static and runtime metadata for a computing application, determining an application criticality of the computing application according to the static metadata using a first machine learning model, determining a data backup option for the computing application according to the application criticality and the runtime metadata, using a second machine learning model, etc.). These solutions are not abstract and cannot be performed as a set of mental acts by a human due to the processing capabilities needed to facilitate the generation of data backup options, for example. Further, some of the processes performed may be performed by a specialized computer for carrying out defined tasks related to data backup option generation. For instance, a specialized computer can be employed to carry out tasks related to generating data backup options or the like.

In an embodiment, a method for generating data backup options identifies computing application metadata including application data, static application metadata and runtime metadata for the application. In this embodiment, application metadata related to application data types includes parameter values such as unstructured data (such as fileservers and data streams); database data; application binary data; and operating system files.

Static application metadata may include one or more of platforms, servers, performance, volumes, retention, error logs, capacities, clients, occupancy, storage, and objects metadata for the computing application. Platforms—the underlying operating system categorical data. Servers—categorical data depicting applications dependent environments. Performance—continuous numerical data representing system performance statistics. Volumes—discrete numerical data of total storage size directly assigned to Application; this can span multiple systems depending on application architecture. Retention—categorical data of application retention tier. Error logs—numerical data representing application availability. Capacity—continuous numerical data representing system resources used by the application. Clients—categorical data representing the users of applications (i.e., other systems, end-user, mixture, etc.). Occupancy—numerical data representing utilization rates of assigned storage. Storage— categorical data representing type of storage used. Objects—binary classification of application dependency on object storage.

Application runtime metadata may include backup size—a discrete value of space occupied (e.g. in GB, TB, . . . ); performance—e.g. requirement for restarting services or applications directly from the backup, or backup files nature (e.g. media, . . . ), or memory; retention period—this can be aligned with external regulations, contracts, tier-based contracts, etc.; number of backup copies—a discrete value of an agreed number of redundant copies; sensitivity of the data—e.g. personal information, sensitive personal information, etc.; application uptime—this can be aligned with service level agreements, operational level agreements—contract/operational constraints (e.g. recovery point objective targets); and the file system—which can vary based on differing platforms.

In an embodiment, the method extracts the application metadata, including the application data, static and runtime metadata from an existing computing environment, including computing environments distributed across cloud computing resources. In an embodiment, the method receives the metadata from a user seeking to utilize the data backup option generator. In this embodiment, the received application metadata includes annotation/labels indicating the criticality of the application data to the providing enterprise. Criticality levels include non-critical, low-critical, enterprise critical, etc. The static metadata for the application also includes annotations regarding application criticality. Application and runtime metadata further include backup annotations relating differing backup classifications such as high availability, disaster recovery (HA/DR) hot standby, (HA/DR)—cold standby, DR only, archive, etc.

In an embodiment, the method identifies the application metadata and annotates the metadata as described above, using the context and computing environment details associated with the metadata.

In this embodiment, the method uses the annotated metadata as training data sets for each of two machine learning classification models. Each of the two machine learning classification models may comprise a convolutional neural network (CNN), a recurrent neural network (RNN), or other known machine learning classification architectures. Once trained each of the respective machine learning constitutes a set of network node weights trained using the training data sets to provide analysis of new data and provide the configured output. For the first machine learning model, the configured output comprises a level of application criticality. For the second model, the output comprises data backup options for the application.

The method trains a first machine learning classification model using the metadata set annotated based on application criticality. Once trained, this machine learning model classifies application criticality according to provided application metadata. In an embodiment, the method divides the metadata set into training data and testing data. The method uses the training data to establish the node weights of the neural network and uses the testing data to validate the trained model's node weightings. The method validates that the model outputs the expected classification for annotated testing data.

The method trains a second machine learning classification model using the metadata annotated according to application backup options. In an embodiment, the method divides the metadata set into training data and testing data. The method uses the training data to establish the node weights of the neural network and uses the testing data to validate the trained model's node weightings. The method validates that the model outputs the expected classification for annotated testing data.

Once trained this second machine learning receives application metadata as an input and provides data backup options as an output. In an embodiment, the trained second machine learning model provides a plurality of backup options as an output for a single application. In this embodiment, each of the backup options of the output includes a confidence level from the model indicating the relative confidence levels of the model in each of the set of backup options. Data backup options comprise a designation of the system components of the destination for the backup e.g., high availability, disaster recovery (HA/DR) hot standby, (HA/DR)—cold standby, DR only, archive, etc., as well as data backup scheduling information setting forth the frequency and defined times of the execution schedule for the data backup for an application.

After training the two machine learning models, the method receives application metadata for new computing applications having no characterization as to application criticality or as to application data backup options. The method passes the new application metadata to the first machine learning model for classification. The model classifies the application's criticality using the metadata, as non-critical, low-critical, enterprise-critical, etc.

In an embodiment, the method utilizes the criticality classification of the application as a screening tool for the inputs to the second machine learning model. In this embodiment, the method passes application metadata associated with highly critical, e.g. enterprise-critical applications to the second machine learning model for analysis. The method does not pass metadata for non-critical and low-critical applications to the second model for analysis. The second model provides an output of one or more data backup options for the enterprise-critical application according to the application metadata and the node weights of the trained machine learning model.

In an embodiment, the method applies the output of application criticality in designating runtime computing environment parameters for an application. Non-critical applications designated for lower reliability environments compared to enterprise-critical applications designated for high reliability environments such as those with uninterruptable power supplies and redundant components.

In an embodiment, the method adds the metadata associated with new computing applications to the existing training and/or testing data sets for each of the first and second machine learning models. The method periodically re-trains each of the models utilizing the expanded training and testing data sets to refine the classification capabilities of the models.

In an embodiment, the method determines application criticality and backup options for all new applications, or provides application criticality and backup options for any new applications which meets or exceeds a user defined threshold level of application criticality. In this embodiment, the method includes thresholds defined according to relationships between features, parameter values, and sets of these which affect output values. For example, a feature having a range of values such that changing values within the range alters the backup destination value between classifications such as high availability, disaster recovery (HA/DR) hot standby, (HA/DR)—cold standby, DR only, archive, has thresholds defined at those critical values where backup destination outputs change between classifications.

Based upon the application metadata being evaluated, the data backup outputs may include actions to: export statistics regarding the size and complexity of a current backup and recovery environment; read empirical performance and risk information across all user platforms; investigate and compare strategic migration options (to cloud); consolidate all user infrastructure and data onto a user's strategic platform; clean and optimize user historic data files; provide safe, secure, cost effective migration solutions; reduce the impact of data protection and backup on a live production host environment; and options to decommission all outdated infrastructure.

In an embodiment, output recommendations include: monitoring trends for DP&R of relational databases; DP&R of in-memory databases; asynchronous replication of the data backups; review of retention periods (expiration) for archiving; evaluate number of backup copies; evaluate recovery point objectives/nearly Continuous/Continuous data protection (CDP); consider the sensitivity of the data (protection of the data content, encryption, etc.); review application consistency vs. crash consistency; consider DP agents vs. agentless (application support without backup client); evaluate Hypervisor level vs. VM-internal backup; evaluate starting services or applications directly from the backup, review the trend towards image-level backups; evaluate Backup2Cloud capabilities; review End device backup/recovery; review energy efficiency differences of the backup methods and media; consider Software Defined Data Protection (SDDP), and review usage of a network data management protocol; (NDMP).

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning data backup option generator program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning data backup option generator program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
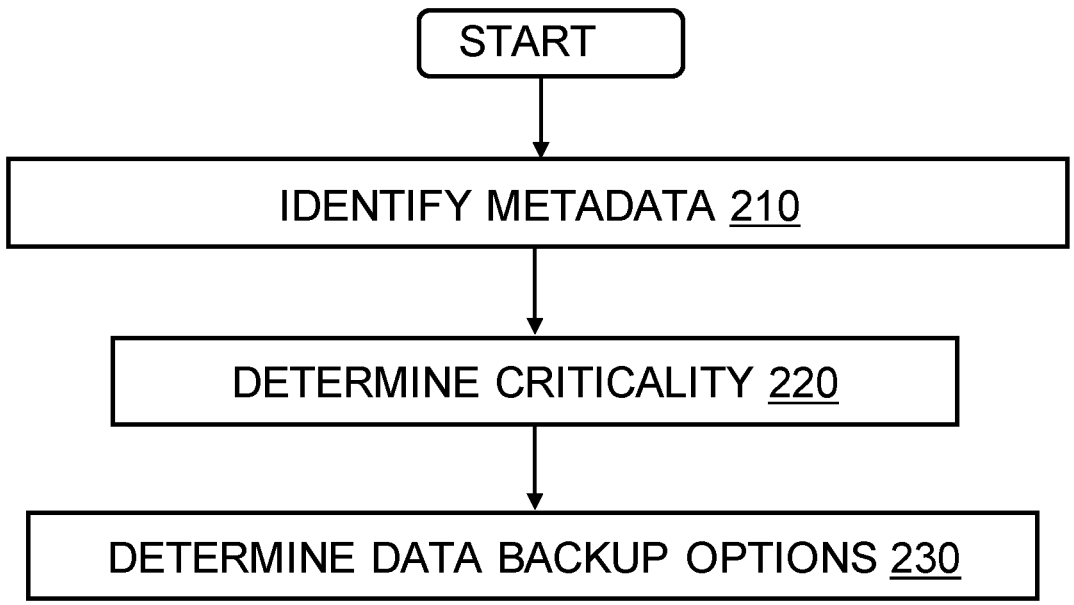
FIG. 2 provides a flowchart depicting an high-level operational sequence, according to an embodiment of the invention.

FIG. 2 provides a flowchart 200, illustrating exemplary activities associated with the practice of the disclosure. After program start, at block 210 the data backup option generation program 175 executing within the computing environment illustrated in FIG. 1, identifies application metadata for a new computing application. Backup options for the new computing application may or may not have been previously specified by a user. Application metadata includes data structure metadata for the application as well as static metadata related to the runtime environment of the application and runtime metadata related to the backup activities associated with the application. In an embodiment, the method identifies the metadata from a dataset provided by a user. In an embodiment, the method scans the computing environment and retrieves the application metadata.

In an embodiment, in an implementation with a CNN, the method utilizes supervised learning where humans provide a list of features with coherent values based on the domain that allows the CNN to learn how to classify from labeled real-life examples considered correct. In an embodiment, the method utilizes unsupervised learning where the CNN "figures out" the features based on statistically relevant patterns (a combined feature extraction and classification approach). In an embodiment, the method utilizes a supervised learning approach for static parameters and an unsupervised learning approach with runtime parameters.

After identifying the metadata, the method passes the application and static metadata to a first machine learning model at block 220. The first machine learning comprises a classification model trained and tested using application and static metadata annotated according to the level of criticality of each associated application. The first machine learning model receives the metadata and outputs an application criticality classification for the new computing application. In an embodiment, the method compares the criticality classification for the new computing application with a user defined criticality threshold, such as a threshold of enterprise critical. In this embodiment, the method passes the runtime metadata for all new computing applications meeting or exceeding the defined criticality threshold to a second machine learning model.

At block 230, the second machine learning model of the method receives the runtime metadata for a new application having an application criticality satisfying the defined criticality threshold, and the model determines at least one backup option for the new computing application. The second machine learning model comprises a classification model trained and tested using application runtime metadata annotated according to application backup options. The second machine learning model provides an output of the at least one backup option to the user. The model may provide an output including more than one backup option and including a confidence level for each provided backup option. In an embodiment, a user selects or otherwise approves a backup option in the provided output. In this embodiment, the method executes the selected or approved backup option. In this embodiment, the backup option includes a system destination for the backup data and an execution schedule for the backup option.

In an embodiment, the method utilizes the metadata associated with new computing applications for which new application criticality and backup option classification have been determined, to augment the original training and testing data set for each of the first and second machine learning models. The models undergo ongoing training with the augmented training data sets to further refine the classification capabilities of each of the models.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Implementation of disclosed embodiments may include local networked environments as well as computing environments distributed across edge cloud and/or cloud computing resources.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
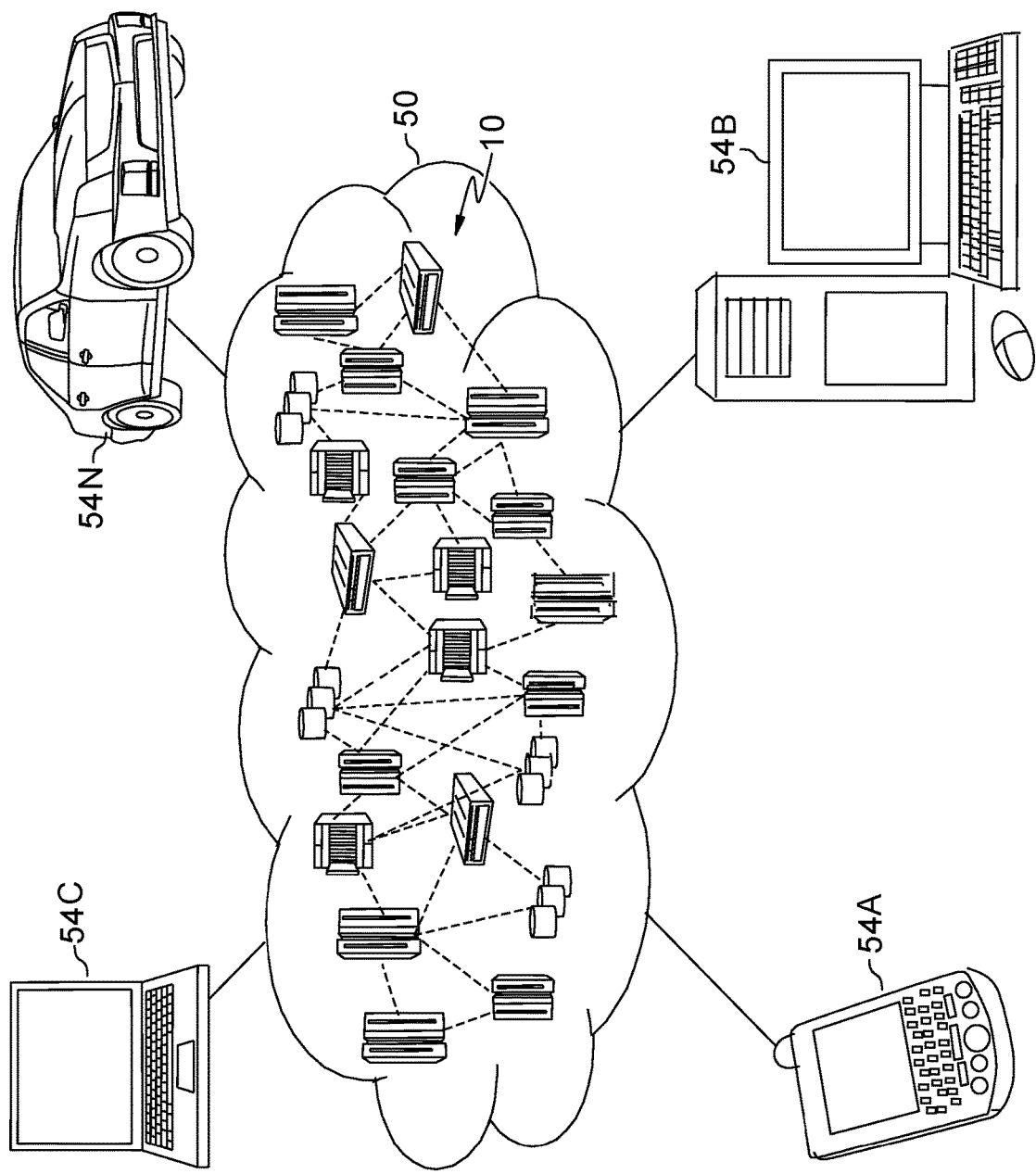
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
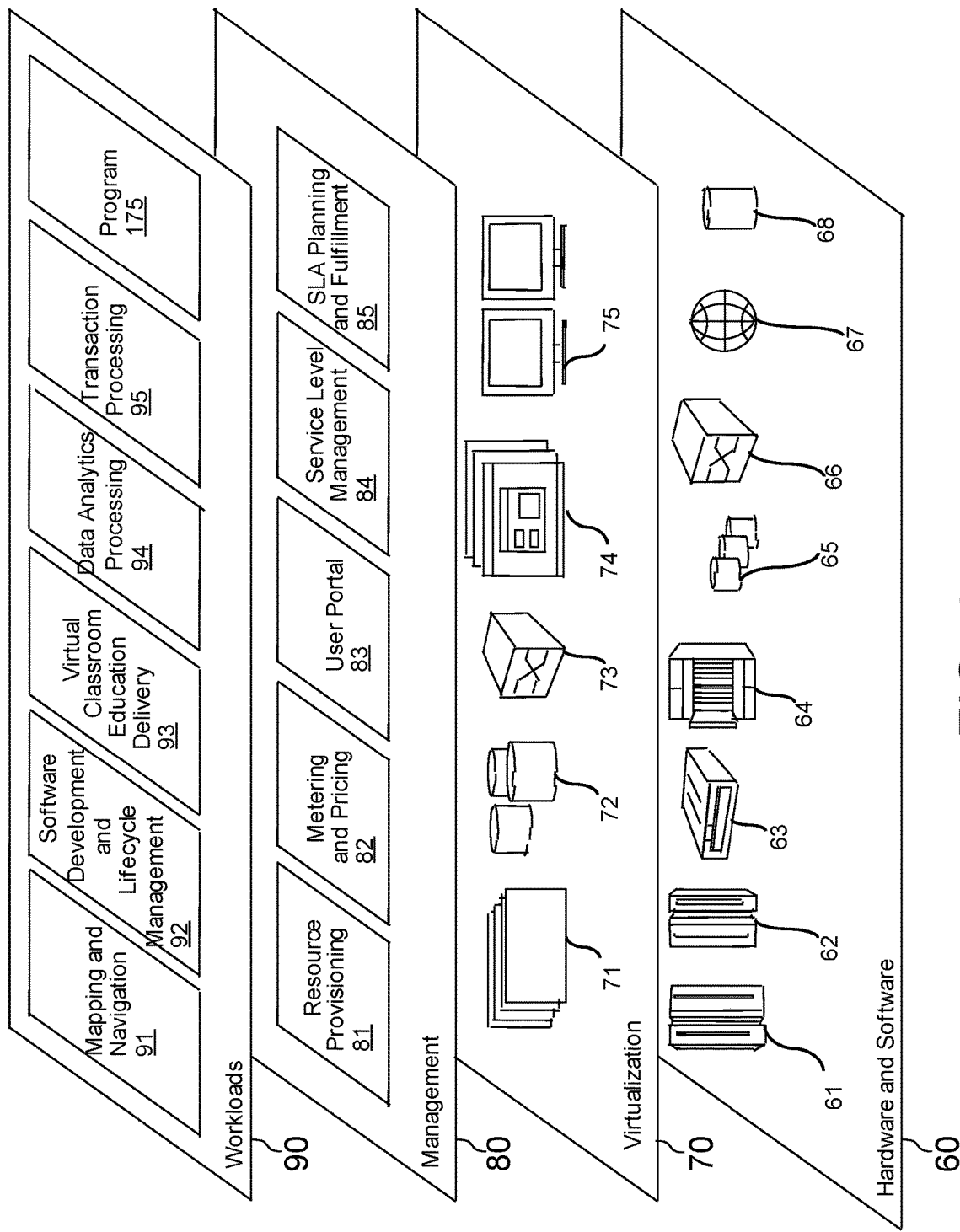
FIG. 4 depicts abstraction model layers, according to an embodiment of the invention.

Referring to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning data backup option generator program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating data protection and recovery data backup options, the method comprising:
   determining, by one or more computer processors, a first application criticality of a computing application according to static metadata using a first machine learning model; and
   determining, by the one or more computer processors, a backup option for data associated with the computing application according to the first application criticality and runtime metadata, using a second machine learning model;
   wherein the first machine learning model is trained, by the one or more computer processors, using the data annotated according to application criticality and received static application metadata annotated according to application criticality; and
   wherein the second machine learning model is trained, by the one or more computer processors, using the data annotated according to an application backup option, and received application runtime metadata annotated according to the application backup option.

2. The computer implemented method according to claim 1, further comprising:
   identifying, by the one or more computer processors, annotated computing application data, the data including application data annotated according to application criticality, static application metadata annotated according to application criticality; application data annotated according to application backup options, and application runtime metadata annotated according to the application backup option for an existing computing application;
   training, by the one or more computer processors, the first machine learning model using the application data annotated according to application criticality and the static application metadata annotated according to application criticality; and
   training, by the one or more computer processors, the second machine learning model using the application data annotated according to an application backup option, and the application runtime metadata annotated according to the application backup option.

3. The computer implemented method according to claim 1, wherein the data backup option comprises at least one of a backup destination, and a backup execution schedule.

4. The computer implemented method according to claim 1, wherein the application criticality comprises a criticality selected from the group consisting of non-critical, low-critical, and enterprise-critical.

5. The computer implemented method according to claim 1, further comprising:
   identifying, by the one or more computer processors, computing application data, the data including application data, static application metadata, and application runtime metadata;
   annotating, by the one or more computer processors, the application data and static application metadata according to application criticality;
   annotating, by the one or more computer processors, the application data and application runtime metadata according to application backup options;
   training, by the one or more computer processors, the first machine learning model using the application data annotated according to application criticality and the static application metadata annotated according to application criticality; and
   training, by the one or more computer processors, the second machine learning model using the application data annotated according to application backup options, and the application runtime metadata annotated according to the application backup option.

6. The computer implemented method according to claim 1, further comprising:
   determining, by the one or more computer processors, application criticality for the computing application exceeds a criticality threshold according to the first machine learning model; and
   determining, by the one or more computer processors, a backup option for the computing application according to application criticality using the second machine learning model.

7. A computer program product for generating data protection and recovery data backup options, the computer program product comprising one or more computer readable storage devices and collectively stored program instructions on the one or more computer readable storage devices, the stored program instructions comprising:
   program instructions to determine a first application criticality of a computing application according to static metadata using a first machine learning model; and
   program instructions to determine a backup option for data associated with the computing application according to the first application criticality and runtime metadata, using a second machine learning model;
   wherein the instructions are programmed to train the first machine learning model using the data annotated according to application criticality and received static application metadata annotated according to application criticality; and
   wherein the instructions are programmed to train the second machine learning model using the data annotated according to an application backup option, and received application runtime metadata annotated according to the application backup option.

8. The computer program product according to claim 7, the stored program instructions further comprising:
   program instructions to receive computing application data, the data including application data, static application metadata, and runtime application metadata;

program instructions to annotate the application data and static application metadata according to application criticality;
program instructions to annotate the application data and application runtime metadata according to application backup options;
program instructions to train the first machine learning model using the application data annotated according to application criticality and the static application metadata annotated according to application criticality; and
program instructions to train the second machine learning model using the application data annotated according to an application backup option, and the application runtime metadata annotated according to the application backup option.

9. The computer program product according to claim 7, wherein the data backup option comprises at least one of a backup destination, and a backup execution schedule.

10. The computer program product according to claim 7, wherein the application criticality comprises a criticality selected from the group consisting of non-critical, low-critical, and enterprise-critical.

11. The computer program product according to claim 7, the stored program instructions further comprising:
program instructions to identify computing application data, the data including application data, static application metadata, and runtime application metadata;
program instructions to annotate the application data and static application metadata according to application criticality;
program instructions to annotate the application data and application runtime metadata according to application backup options;
program instructions to train the first machine learning model using the application data annotated according to application criticality and the static application metadata annotated according to application criticality; and
program instructions to train the second machine learning model using the application data annotated according to an application backup option, and the application runtime metadata annotated according to the application backup option.

12. The computer program product according to claim 7, the stored program instructions further comprising:
program instructions to determine application criticality for the computing application exceeds a criticality threshold according to the first machine learning model; and
program instructions to determine a backup option for the computing application according to application criticality using the second machine learning model.

13. A computer system for generating data protection and recovery data backup options, the computer system comprising:
one or more computer processors;
one or more computer readable storage devices; and
stored program instructions on the one or more computer readable storage devices for execution by the one or more computer processors, the stored program instructions comprising:
program instructions to determine a first application criticality of a computing application according to static metadata using a first machine learning model; and
program instructions to determine a backup option for data associated with the computing application according to the first application criticality and runtime metadata, using a second machine learning model;
wherein the instructions are programmed to train the first machine learning model using the data annotated according to application criticality and received static application metadata annotated according to application criticality; and
wherein the instructions are programmed to train the second machine learning model using the data annotated according to an application backup option, and received application runtime metadata annotated according to the application backup option.

14. The computer system according to claim 13, the stored program instructions further comprising:
program instructions to receive computing application data, the data including application data, static application metadata, and runtime application metadata;
program instructions to annotate the application data and static application metadata according to application criticality;
program instructions to annotate the application data and application runtime metadata according to application backup options;
program instructions to train the first machine learning model using the application data annotated according to application criticality and the static application metadata annotated according to application criticality; and
program instructions to train the second machine learning model using the application data annotated according to an application backup option, and the application runtime metadata annotated according to the application backup option.

15. The computer system according to claim 13, wherein the data backup option comprises at least one of a backup destination, and a backup execution schedule.

16. The computer system according to claim 13, the stored program instructions further comprising:
program instructions to identify computing application data, the data including application data, static application metadata, and runtime application metadata;
program instructions to annotate the application data and static application metadata according to application criticality;
program instructions to annotate the application data and application runtime metadata according to application backup options;
program instructions to train the first machine learning model using the application data annotated according to application criticality and the static application metadata annotated according to application criticality; and
program instructions to train the second machine learning model using the application data annotated according to an application backup option, and the application runtime metadata annotated according to the application backup option.

17. The computer system according to claim 13, the stored program instructions further comprising:
program instructions to determine the application criticality for the computing application exceeds a criticality threshold according to the first machine learning model; and
program instructions to determine a backup option for the computing application according to the application criticality using the second machine learning model.

* * * * *